United States Patent
Chen

(10) Patent No.: US 9,215,437 B2
(45) Date of Patent: Dec. 15, 2015

(54) PASSIVE 3D IMAGE SYSTEM AND IMAGE PROCESSING METHOD THEREOF

(75) Inventor: Chung-Yi Chen, Nantou County (TW)

(73) Assignee: MSTAR SEMICONDUCTOR, INC., Hsinchu (TW)

( * ) Notice: Subject to any disclaimer, the term of this patent is extended or adjusted under 35 U.S.C. 154(b) by 994 days.

(21) Appl. No.: 13/241,720

(22) Filed: Sep. 23, 2011

(65) Prior Publication Data
US 2013/0009947 A1    Jan. 10, 2013

(30) Foreign Application Priority Data

Jul. 4, 2011    (TW) .............................. 100123542 A

(51) Int. Cl.
*H04N 13/00*    (2006.01)
*H04N 13/04*    (2006.01)

(52) U.S. Cl.
CPC ....... *H04N 13/0007* (2013.01); *H04N 13/0434* (2013.01)

(58) Field of Classification Search
None
See application file for complete search history.

(56) References Cited

U.S. PATENT DOCUMENTS

| | | | |
|---|---|---|---|
| 6,104,753 A * | 8/2000 | Kim et al. | 375/240.16 |
| 7,515,183 B2 | 4/2009 | Yang et al. | |
| 7,724,294 B2 | 5/2010 | Ahn et al. | |
| 2006/0012676 A1 | 1/2006 | Tomita | |
| 2011/0273531 A1* | 11/2011 | Ito et al. | 348/43 |

OTHER PUBLICATIONS

Liu et al. "Real Time Synthesis of 3D Contents Based on 3D Display Format", vol. 16, IPPR.org, Jun. 2010, p. 4 lines 6-7.
Tseng "A Study on a Dual Target Tracking System Using Stereo Visual Servoing", Chung Yuan Christian University, Jul. 2010, p. 8 chapter 2.1.2 and p. 9 chapter 2.1.3.

* cited by examiner

*Primary Examiner* — Geepy Pe
(74) *Attorney, Agent, or Firm* — WPAT, PC; Justin King

(57) ABSTRACT

A passive 3D image system includes a passive 3D image display apparatus, a scaling module and a luminance adjusting module. The 3D passive image display apparatus includes N rows of display units. After receiving an original image including N rows of original data, the scaling module merges the N rows of original data to generate a scaled image including N/2 rows of scaled data. The original image is either a left-eye image or a right-eye image. The luminance adjusting module adjusts the N/2 rows of scaled data to increase the luminance of the scaled image.

15 Claims, 3 Drawing Sheets

PASSIVE 3D IMAGE SYSTEM AND IMAGE PROCESSING METHOD THEREOF

FIELD OF THE INVENTION

The present invention relates to an image display system, and more particularly to a technique for enhancing a resolution of 3D images.

BACKGROUND OF THE INVENTION

Along with the development of software and hardware techniques, commercial and household 3D display apparatuses become matured and 3D images have also become a great development trend in multimedia. Current 3D image display techniques are in general categorized into active and passive types, which shall be described below.

The active 3D image display technique alternately presents left-eye and right-eye images on a single monitor. Dedicated glasses worn by a viewer shield a right eye of the viewer when a left-eye image is presented and shield a left eye of the viewer when a right-eye image is presented. A visual system of the viewer automatically combines images successively received by the both eyes to 3D images. Due to vision persistence, the brief shielding by the 3D glasses against the presented images remains unnoticed by the viewer as long as a switching frequency of the left-eye and right-eye images is fast enough. However, the active technique suffers from a drawback that, a wireless communication mechanism is necessarily provided at both terminals in order to achieve synchronous switching of the images on the display apparatus and the switching of the 3D glasses. Thus, the 3D glasses not only cost more but also are bulkier. In addition, flickers in visual effects are incurred when image data lower than 60 Hz is presented to the human eyes, and further lead to discomfort of the eyes. Therefore, since the active 3D image display technique alternately presents left-eye and right-eye images on a single monitor, a display system of the active 3D image display technique needs to support a display frequency double to that of a common display system to render an equivalent display frequency with respect to the human eyes. In other words, the active display technique is only suitable for display systems supporting up to a frame rate of 120 Hz, and is hence not widely adopted.

On the other hand, the passive 3D image display technique simultaneously presents left-eye and right-eye images in a single image frame. As shown in FIG. 1, odd-row pixels R1, R2, R3 . . . correspond to the right-eye image, and even-row pixels L1, L2, L3 . . . correspond to the left-eye image. Take a display with a vertical resolution of 1080 pixels as an example, the image frame comprises two images—540 rows of right-eye image data and 540 rows of left-eye data, which are horizontally staggered.

A passive 3D image display comprises an exteriorly adhered polarizing film. For example, a polarization angle corresponding to the odd-row pixels R1, R2, R3 . . . may be designed as 45 degrees, and polarization angle corresponding to the even-row pixels L1, L2, L3 may be designed as 135 degrees. Thus, a left lens and a right lens of the glasses worn by the viewer only allow the passing of light beams with a polarization angle of respectively 45 degrees and 135 degrees, so that different images are respectively received by the left and right eyes. Similarly, the viewer automatically combines images respectively received by the both eyes simultaneously through human visual characteristics to form a corresponding 3D image.

The polarizing film is an inexpensive material, and an overall cost of the passive 3D display system is relatively low. In addition, glasses for the passive 3D display system are also simpler and compact than those for the active system. Consequently, the passive 3D image display system has a greater market share.

In continuation of the above discussion, the image frame shown in FIG. 1 is formed by the alternately arranged left-eye and right-eye images, in a way that the horizontal resolution for respectively presenting the left-eye image data and the right-eye image data is only 540 pixels. However, the horizontal resolution of original left-eye and right-eye image data initially inputted is both 1080 pixels. To provide the left-eye and right-eye image data with a 540-pixel horizontal resolution, the original left-eye and right-eye images need to first undergo appropriate calculations and merging. One of the most common calculation and merging approach is to average two neighboring rows of pixels of the original right-eye (left-eye) image to generate a row of pixels to be displayed. For example, an average of the uppermost first and second rows of pixels in the original right-eye image is calculated to generate the first-row pixel R1 in FIG. 1. Similarly, the uppermost third and fourth rows of pixels in the original right-eye image are calculated to generate the third-row pixel R2 in FIG. 1. Such approach however also suffers from a drawback that, the horizontal resolution of the images perceived by the left and right eyes of the viewer is only 540 pixels even though the horizontal resolution of the display is 1080, meaning that a data amount of the original image is halved. As a result, the image may appear as having insufficient luminance, details and clearness to the viewer.

To solve the above issue of insufficient details provided by the passive 3D image display system, a frame-rate doubling conversion associated with the prior art is proposed. For example, 60 Hz is up-converted to 120 Hz. In other words, apart from distinguishing the left-eye and right-eye images with a spatial separation technique, the above prior art further adopts a temporal separation technique to enhance an image resolution. In the above prior art, original left-eye images and right-eye images are respectively divided into two groups. As shown in FIG. 2A, at $\frac{1}{120}$ second, an image displayed on the monitor comprises odd-row data (RO1, RO3, RO5 . . . ) of an original right-eye image and odd-row data (LO1, LO3, LO5 . . . ) of a corresponding original left-eye image. Also, as shown in FIG. 2B, at $\frac{2}{120}$ second, an image displayed on the monitor comprises even-row data (RO2, RO4, RO6 . . . ) of the original right-eye image and even-row data (LO2, LO4, LO6 . . . ) of the original left-eye image.

As shown in FIG. 2A and FIG. 2B, all data of the original right-eye and left-eye images are presented to the image frame. Within $\frac{1}{60}$ second, image data entering the visual system of a viewer is thus more than that shown in FIG. 1, so that the viewer truly feels the details of the image are enhanced. However, due to the temporal separation, although the frame rate of the images displayed on the display system is in fact doubled to 120 Hz, a frame rate perceived to the human eyes maintains 60 Hz. Therefore, the conventional technique shown in FIG. 2A and FIG. 2B is not quite prevalent since it is only suitable for display systems capable of doubling the frame rate to 120 Hz.

SUMMARY OF THE INVENTION

Therefore, an object of the present invention is to provide a passive 3D image system and an image processing method thereof. By utilizing characteristics of the passive 3D image system, the system and method of the present invention are capable of increasing a luminance of an image so that a viewer is enabled to perceive enhanced details of the image.

The present invention provides a passive 3D image system comprising a passive 3D image display module, a down-scaling module and a luminance adjusting module. The passive 3D image system receives an original image (a left-eye image or a right-eye image) comprising N rows of original data. The down-scaling module generates a scaled image comprising N/2 rows of scaled data according to the N rows of original data. The luminance adjusting module adjusts the N/2 rows of scaled data to increase an overall luminance of the scaled image. The adjusted scaled image comprises N/2 rows of processed data, which is then displayed by the passive 3D image display module comprising a polarizing film.

The present invention further provides an image processing apparatus that cooperates with passive 3D image display apparatus comprising a polarizing film. The image processing apparatus receives an original image (a left-eye image or a right-eye image) comprising N rows of original data. The down-scaling module generates a scaled image comprising N/2 rows of scaled data according to the N rows of original data. The luminance adjusting module adjusts the N/2 rows of scaled data to increase an overall luminance of the scaled image. The adjusted scaled image comprises N/2 rows of processed data, which is then displayed by the passive 3D image display module comprising a polarizing film.

The present invention further provides an image processing method applied to a passive 3D image display apparatus comprising a polarizing film. The method comprises: receiving an original image comprising N rows of original data, the original image being a left-eye image or a right-eye image; down-scaling the N rows of original data to generate a scaled image comprising N/w rows of scaled data; and adjusting the N/2 rows of scaled data to increase an overall luminance of the scaled image.

Compared to a conventional passive 3D image display system, the system of the present invention provides an image of a better definition. Further, the method of the present invention is also applicable to hardware having a fixed frame rate, and offers better application flexibilities compared to the conventional technique that doubles the frame rate.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
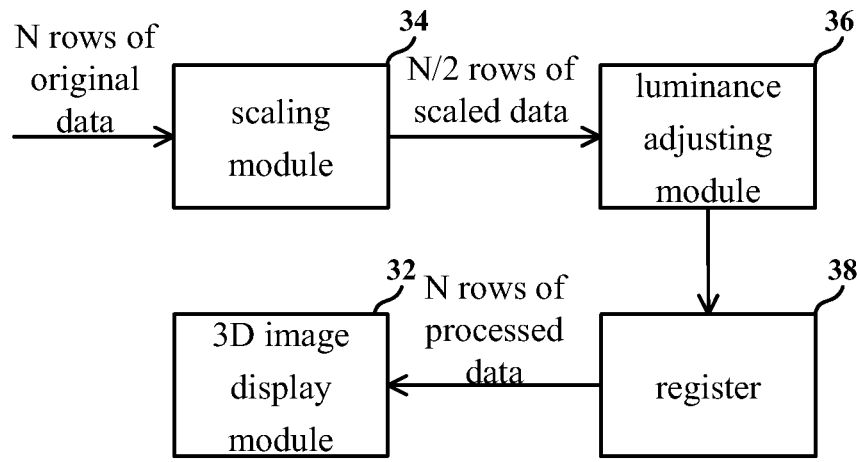
FIG. 3 is a block diagram of a passive 3D image display system according to an embodiment of the present invention.

A passive 3D image system according to an embodiment of the present invention is provided. For example, the system is a household television system or a commercial movie playback system. Referring to FIG. 3, a passive 3D image system 30 comprises a passive 3D image display module 32, a scaling module 34, a luminance adjusting module 36 and a register 38. To focus on the technique of the present invention, other hardware devices such as speakers in the passive 3D image system 30 are not illustrated in the diagram.

The passive 3D image display module 32 comprises N rows of display units, where N is a positive even integer. In this embodiment, N represents a horizontal resolution of the passive 3D image display module 32. In other words, for example, the N rows of display units form a complete display image of the passive 3D image display module 32. Take the passive 3D image display module 32 supporting the full high-definition (FHD) standard of a 1920*1080 resolution as an example, N equals 1080. In other embodiments, the N rows of display units may correspond to merely a partial area of the display image of the passive 3D image display module 32.

After the passive 3D image system 30 receives an original image comprising N rows of original data, the scaling module 34 performs a merging calculation according to the N rows of original data to generate a scaled image comprising N/2 rows of scaled data (where the scaled image is a down-scaled image). Take the original image comprising 1080 rows of original data as an example, the scaling module 34 merges the 1080 rows of original data into 540 rows of scaled data. The original image may be a left-eye image or a right-eye image. For example, the scaling module 34 may first process an original left-eye image and then process an original right-eye image of a same image frame, and so forth.

In an embodiment according to the present invention, the scaling module 34 may calculate an average of uppermost first-row pixels and uppermost second-row pixels in the original image to generate a first-row scaled data, calculate an average of uppermost third-row pixels and uppermost fourth-row pixels in the original image to generate a second-row scaled data, and so forth. More specifically, the merging calculation adopted by the scaling module 34 merges a $(2i-1)$th-row original data and a $(2i)$th-row original data of the N rows of original data to generate an $(i)$th-row scaled data of the N/2 rows of scaled data, where i is an integral parameter from 1 to N/2. Alternatively, in other embodiments, the scaling module 34 may also generate a row of scaled data according to more neighboring rows of the original data instead of two rows of original data.

Figure 1:
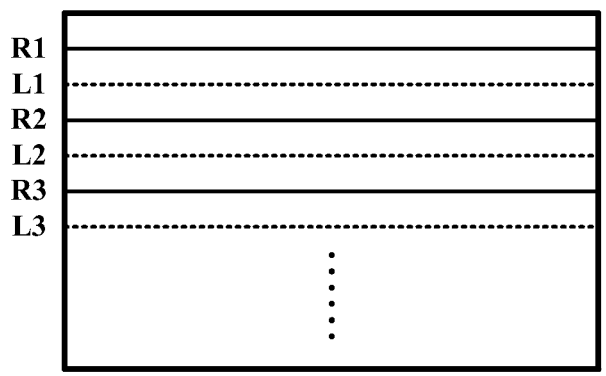
FIG. 1 is a schematic diagram of an example of a passive 3D image.
Figure 2A:
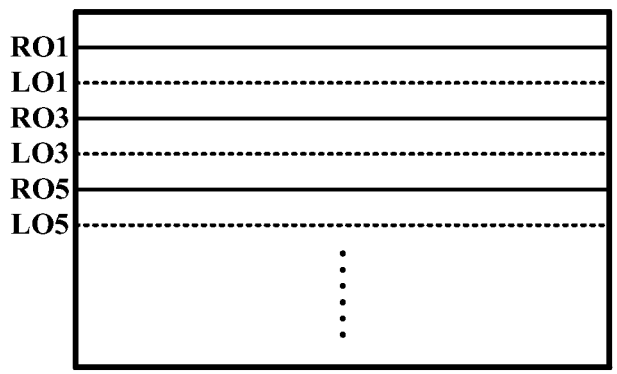
FIGS. 2A and 2B are schematic diagrams of examples of passive 3D images adopting a doubled image frame rate.
Figure 2B:
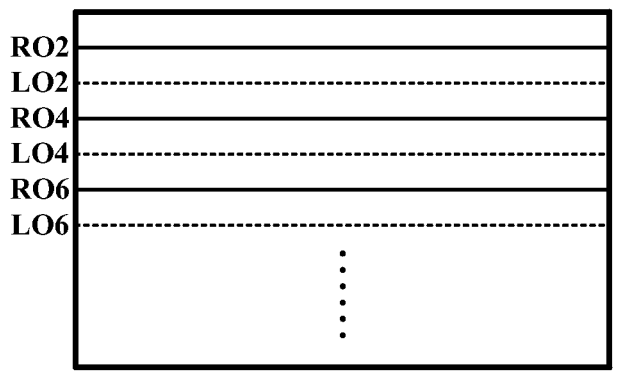

Take the image shown in FIG. 1 as an example, supposing the above original image is an original left-eye image, the scaling module 34 generates a plurality of rows of scaled data to be left-eye image data rows L1, L2, L3 . . . ; supposing above original image is an original right-eye image, the scaling module 34 generates a plurality of rows of scaled data to be right-eye image data rows R1, R2, R3 . . . . Therefore, the N/2 rows of right-eye scaled data and the N/2 rows of left-eye scaled data generated by the scaling module 34 may then be combined to an image comprising N rows of data.

Subsequently, the luminance adjusting module 36 adjusts the N/2 rows of scaled data to increase the luminance of the scaled image. Referring to FIG. 1, the luminance adjusting module 36 adjusts the left-eye image data rows L1, L2, L3 . . . to increase the luminance of a part of the scaled image corresponding to the left eye, and adjusts the right-eye image data rows R1, R2, R3 . . . to increase the luminance of another part of the scaled image corresponding to the right eye. In an embodiment, the luminance adjusting module 36 first receives from the scaling module 34 and processes the N/2 rows of scaled data of the left-eye image, which are then adjusted by the luminance adjusting module 36 into N/2 rows of adjusted and processed scaled data of the left-eye image to be stored in register 38. When N/2 rows of adjusted and processed scaled data of the right-eye image are also provided by the luminance adjusting module 36, the register 38 then provides the N rows of processed data to the passive 3D image display module 32 for displaying.

As previously described, the passive 3D image display module 32 is exteriorly adhered with a polarizing film. The right lens of the glasses worn by the viewer only allows the passing of light beams of a predetermined polarization angle, while the left lens of the glasses only allows the passing of light beams of another predetermined polarization angle, and thus the left eye and the right eye perceive different images. That is, for the left eye of the viewer, the horizontal lines corresponding to the right-eye image in a frame appear as black lines; on the contrary, for the right eye of the viewer, the horizontal lines corresponding to the left-eye image in the frame also appear as black lines Due to such characteristic, the viewer observes more details of the image after the luminance of the image is increased by the luminance adjusting module 36. An essence of the present invention is based on such characteristic to appropriately adjust and increase the luminance of a passive 3D image to achieve an effect similar to sharpening. As shown in FIG. 1, since the left-eye image data rows L1 and L2 observed by the right eye of the viewer appear as black lines, by increasing the luminance of the right-eye image data row R2 is in equivalent to increasing the contrast between the data row R2 and its upper and lower neighboring rows, so as to achieve effects similar to sharpening.

In an embodiment, the luminance adjusting module 36 increases the luminance of the scaled image by adjusting the luma component Y in the YUV color space of the scaled data. The advantage of such approach is that original colors remain unaffected by adjusting the luma component Y alone. In other embodiments, for example, the luminance adjusting module 36 may also increase the luminance of the image by adjusting the grayscale values of RGB color components of the scaled data.

In an example of adjusting the luminance Y, the scaled data generated by the scaling module 34 may be generated by a merging calculation on the first-row original data and the second-row original data. Supposing the first-row original data has a first luminance Y1 and the second-row original data has a second luminance Y2, the luminance adjusting module 36 determines a processed luminance Yc of the processed data according to an equation below:

$$Yc = \left(\frac{Y1 + Y2}{2}\right) \times w1 + \max(Y1, Y2) \times w2$$

In the equation above, w1 and w2 are respectively a weighting coefficient, and a sum of w1 and w2 is 1.

It is observed from the above equation that, the process luminance Yc becomes greater as the weighting coefficient w2 gets larger. In practice, the weighting coefficients w1 and w2 may be predetermined values, or may be designed to associate with respective neighboring images of the first-row original data and the second-row original data. For example, when changes in image areas neighboring to the first-row original data and/or the second-row original data are drastic, the weighting coefficient w2 may be increased to reinforce the contrast of that area. In other embodiments, the luminance adjusting module 36 may also be designed as to increase or decrease the weighting coefficients of the scaled image according to other principles.

Figure 4:
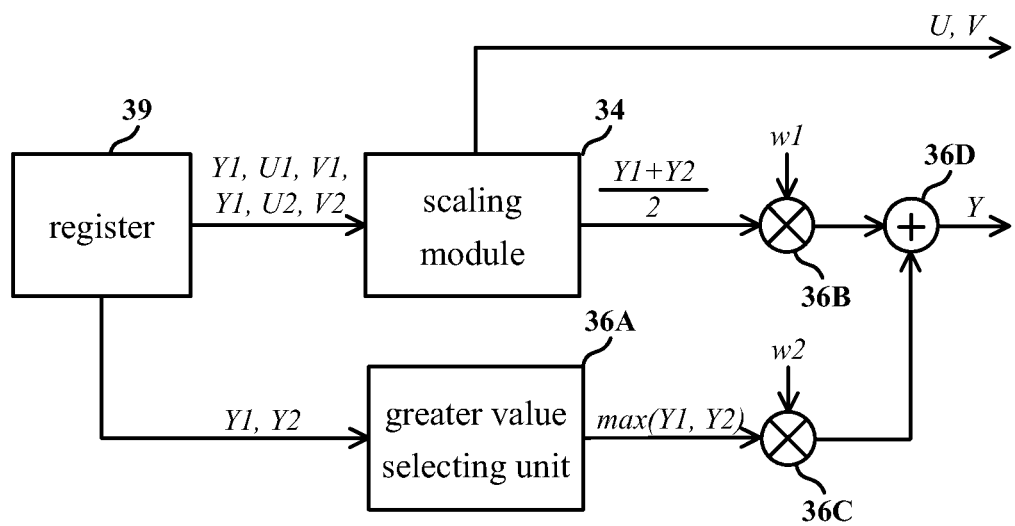
FIG. 4 is a detailed schematic diagram of a luminance adjusting module according to an embodiment of the present invention.

FIG. 4 shows a detailed schematic diagram of the scaling module 34 and the luminance adjusting module 36. In this embodiment, the luminance adjusting module 36 comprises a greater value selecting unit 36A, a multiplier 36B, a multiplier 36C and an adder 36D. Referring to FIG. 4, a register 39 provides a first-row original data (Y1, U1, V1), and a second-row original data (Y2, U2, V2) to the scaling module 34, and provides respective luminances Y1 and Y2 of the first-row original data and the second-row original data to the greater value selecting unit 36A. Besides the chrominance components U and V of the scaled data, an output signal of the scaling module 34 also comprises the luma component (Y1+Y2)/2 transmitted to the multiplier 36B. The greater value selecting unit 36A selects from Y1 and Y2 a greater value to be transmitted to the multiplier 36C. The multipliers respectively perform a multiplication by the weighting coefficients w1 and w2. The adder 36D adds upweighted results to generate the processed luminance Yc of the processed data.

Although the above luminance adjusting mechanism achieves an effect similar to sharpening, operations thereof are not quite the same as those of a common image sharpening procedure. For example, a common sharpening procedure is performed after down-scaling a size of the image, which entails that a mandatory register for buffering between an image down-scaling circuit and a sharpening circuit is necessary. On the contrary, in the embodiment shown in FIG. 4, the scaling module 34 and the luminance adjusting module 36 may share the same register 39.

An image processing apparatus for cooperating with a passive 3D image display apparatus comprising a polarizing film is provided according to an embodiment of the present invention. The image processing apparatus comprises the scaling module 34 and the luminance adjusting module 36 shown in FIG. 3. That is to say, the scaling module 34 and the luminance adjusting module 36 may exist independently to cooperate with various types of passive 3D image display apparatuses that need to increase an image definition.

Figure 5:
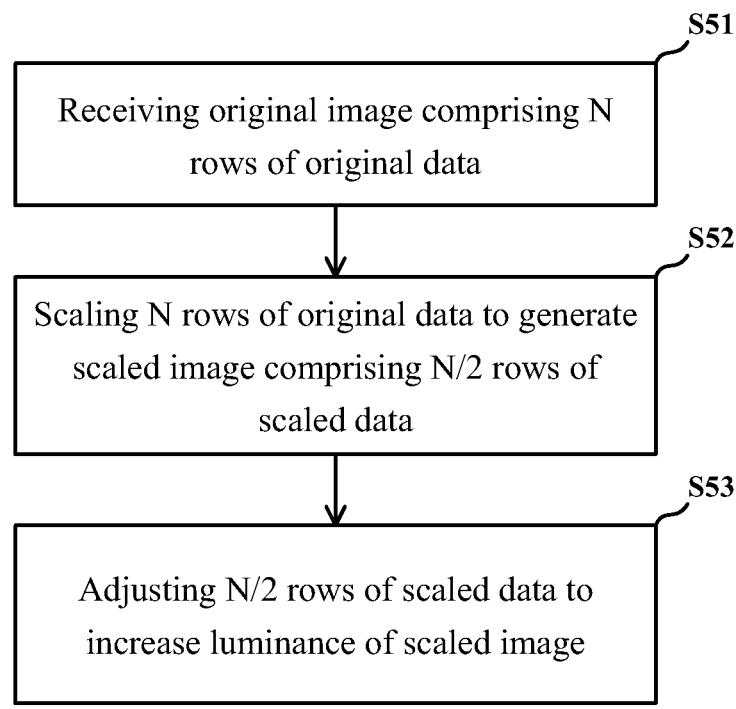
FIG. 5 is a flowchart of an image processing method according to an embodiment of the present invention.

An image processing method applied to a passive 3D image display apparatus comprising a polarizing film according to an embodiment of the present invention is provided. FIG. 5 shows a flowchart of the image processing method. In Step S51, an original image comprising N rows of original data is received. The original image may be a left-eye image or a right-eye image. In Step S52, the N rows of original data are merged to generate a scaled image comprising N/2 rows of scaled data. In Step S53, the N/2 rows of scaled data are adjusted to increase the luminance of the scaled image, which comprises N/2 rows of processed data.

Details of Step S52 for merging data and Step S53 for increasing the luminance are as previously described in the foregoing embodiments, and are therefore omitted herein.

In conclusion, by utilization characteristics of a passive 3D image display system, the system and method of the present invention are capable of increasing the image luminance to allow a viewer to perceive enhance image details. Compared to a conventional passive 3D image display system, the system of the present invention offers a better visual effect of a higher definition. Therefore, the method is applicable to hardware that has a fixed frame rate and provides better application flexibilities than the prior art of doubling the image frame rate.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A passive 3D image system, for receiving an original image comprising N rows of original data, the original image being a left-eye image or a right-eye image, N being a positive even integer, the passive 3D image system comprising:
   a passive 3D image display module, comprising a polarizing film;
   a scaling module, for generating a scaled image comprising N/2 rows of scaled data according to the N rows of original data, wherein the scaled data is generated by the scaling module according to a first original data and a second original data, and the luminance of the scaled data is adjusted according to an average luminance and a larger luminance of the first original data and the second original data; and
   a luminance adjusting module, for adjusting the N/2 rows of scaled data to increase a luminance of the scaled image according to the N rows of original data;
   wherein, the adjusted scaled image comprises N/2 rows of processed data, and is displayed by the passive 3D image display.

2. The passive 3D image system according to claim 1, wherein the scaling module merges a (2i−1)th-row original data and a (2i)th-row original data of the N rows of original data to generate an (i)th-row scaled data of the N/2 rows of scaled data, with i being an integer between 1 and N/2.

3. The passive 3D image system according to claim 1, wherein the luminance adjusting module increases the luminance of the scaled image by adjusting a luma component of a YUV color space of the scaled data.

4. The passive 3D image system according to claim 1, wherein the scaled data is generated by the scaling module according to a first original data and a second original data, the first original data has a first luminance Y1, the second original data has a second luminance Y2, the processed data of the scaled image correspondingly has a processed luminance Yc, and the luminance adjusting module increases the luminance of the scaled image according to the following equation:

$$Yc = \left(\frac{Y1 + Y2}{2}\right) \times w1 + \max(Y1, Y2) \times w2,$$

where, w1 and w2 are weighting coefficients with a sum equal to 1.

5. The passive 3D image system according to claim 4, wherein the weighting coefficients w1 and w2 are associated with neighboring images respectively corresponding to the first original data and the second original data.

6. An image processing apparatus, for operating with a passive 3D image display apparatus comprising a polarizing film, the image processing apparatus receiving an original image comprising N rows of original data, the original image being a left-eye image or a right-eye image, N being a positive even integer, the image processing apparatus comprising:
   a scaling module, for generating a scaled image comprising N/2 rows of scaled data according to the N rows of original data, wherein the scaled data is generated by the scaling module according to a first original data and a second original data, and the luminance of the scaled data is adjusted according to an average luminance and a larger luminance of the first original data and the second original data; and
   a luminance adjusting module, for adjusting the N/2 rows of scaled data to increase a luminance of the scaled image according to the N rows of original data;
   wherein, the scaled image comprises N/2 rows of processed data, and is displayed by the passive 3D image display module.

7. The image processing apparatus according to claim 6, wherein the scaling module merges a (2i−1)th-row original data and a (2i)th-row original data of the N rows of original data to generate an (i)th-row scaled data of the N/2 rows of scaled data, with i being an integer between 1 and N/2.

8. The image processing apparatus according to claim 6, wherein the luminance adjusting module increases the luminance of the scaled image by adjusting a luma component of a YUV color space of the scaled data.

9. The image processing apparatus according to claim 6, wherein the scaled data is generated by the scaling module according to a first original data and a second original data, the first original data has a first luminance Y1, the second original data has a second luminance Y2, and the processed data of the scaled image correspondingly has a processed luminance Yc, and the luminance adjusting module increases the luminance of the scaled image according to the following equation:

$$Yc = \left(\frac{Y1 + Y2}{2}\right) \times w1 + \max(Y1, Y2) \times w2,$$

wherein, w1 and w2 are weighting coefficients with a sum equal to 1.

10. The image processing apparatus according to claim 9, wherein the weighting coefficients w1 and w2 are associated with neighboring images respectively corresponding to the first original data and the second original data.

11. An image processing method, applied to a passive 3D image display apparatus comprising a polarizing film, the image processing method comprising:
   a) receiving an original image comprising N rows of original data, the original image being a left-eye image or a right-eye image;
   b) scaling the N rows of original data to generate a scaled image comprising N/2 rows of scaled data generated according to a first original data and a second original data and the luminance of the scaled data is adjusted according to an average luminance and a larger luminance of the first original data and the second original data; and
   c) adjusting the N/2 rows of scaled data to increase a luminance of the scaled image according to the N rows of original data, the adjusted scaled image comprising N/2 rows of processed data.

12. The image processing method according to claim 11, wherein Step (b) comprises merging a (2i−1)th-row original data and a (2i)th-row original data of the N rows of original data to generate an (i)th-row scaled data of the N/2 rows of scaled data, with i being an integer between 1 and N/2.

13. The image processing method according to claim 11, wherein Step (c) comprises increasing the luminance of the scaled image by adjusting a luma component of a YUV color space of the scaled data.

14. The image processing method according to claim 11, wherein the scaled data is generated according to a first original data and a second original data, the first original data has a first luminance Y1, the second original data has a second luminance Y2, and the processed data of the scaled image correspondingly has a processed luminance Yc, and the luminance adjusting module increases the luminance of the scaled image according to the following equation:

$$Yc = \left(\frac{Y1 + Y2}{2}\right) \times w1 + \max(Y1, Y2) \times w2,$$

with w1 and w2 being weighting coefficients with a sum equal to 1.

15. The image processing method according to claim 14, wherein the weighting coefficients w1 and w2 are associated with neighboring images respectively corresponding to the first original data and the second original data.

* * * * *